US010467221B2

(12) United States Patent
Chen

(10) Patent No.: US 10,467,221 B2
(45) Date of Patent: Nov. 5, 2019

(54) SOFTWARE FUNCTION VERIFICATION SYSTEM AND SOFTWARE FUNCTION VERIFICATION METHOD

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 606 days.

(21) Appl. No.: 15/239,787

(22) Filed: Aug. 17, 2016

(65) Prior Publication Data

US 2017/0337240 A1 Nov. 23, 2017

(30) Foreign Application Priority Data

May 19, 2016 (TW) .............................. 105115623 A

(51) Int. Cl.
*G06F 17/30* (2006.01)
*G06F 16/23* (2019.01)
(Continued)

(52) U.S. Cl.
CPC ...... *G06F 16/2365* (2019.01); *G06F 16/2282* (2019.01); *G06F 16/285* (2019.01);
(Continued)

(58) Field of Classification Search
CPC .. G06Q 10/06; G06Q 10/06313; G06F 16/93; G06F 16/951; G06F 16/24578;
(Continued)

(56) References Cited

U.S. PATENT DOCUMENTS 8,677,310 B2 * 3/2014 Weatherhead ............ G06F 8/70
700/131
2008/0046299 A1 * 2/2008 Simons .............. G06Q 10/0639
705/7.23
(Continued)

FOREIGN PATENT DOCUMENTS

TW 201342239 10/2013
TW 201512838 4/2015

*Primary Examiner* — Dangelino N Gortayo
(74) *Attorney, Agent, or Firm* — JCIPRNET

(57) ABSTRACT

A software function verification system and a software function verification method are provided. The system includes a first database, a document acquisition device, and a function verification device. The function verification device analyzes a first-party document according to a machine learning technology to generate a plurality of first-party technology points and converts the first-party technology points into a first-party decision table. The function verification device analyzes a second-party document to generate a plurality of second-party technology points and converts the second-party technology points into a second-party decision table. The function verification device respectively converts the first-party decision table and the second-party decision table into a first-party tree structure and a second-party tree structure and compares the first-party tree structure and the second-party tree structure to determine the degree of functional differences between the first-party document and the second-party document.

8 Claims, 4 Drawing Sheets

(51) Int. Cl.
*G06N 20/00* (2019.01)
*G06F 16/93* (2019.01)
*G06F 16/28* (2019.01)
*G06F 16/22* (2019.01)
*G06F 16/335* (2019.01)
*G06Q 10/06* (2012.01)
*G06F 16/951* (2019.01)

(52) U.S. Cl.
CPC .......... *G06F 16/337* (2019.01); *G06F 16/93* (2019.01); *G06N 20/00* (2019.01); *G06F 16/2358* (2019.01); *G06F 16/951* (2019.01); *G06Q 10/06* (2013.01)

(58) Field of Classification Search
CPC .............. G06F 16/285; G06F 17/2705; G06F 16/2358; G06F 16/24556
USPC ........ 707/739, 748, 758, 769, 822; 717/101, 717/104, 124, 121, 126
See application file for complete search history.

(56) References Cited

U.S. PATENT DOCUMENTS

| | | | |
|---|---|---|---|
| 2008/0270103 A1* | 10/2008 | Kaszynski | G06F 17/5022 703/22 |
| 2009/0193294 A1* | 7/2009 | Nakamura | G06F 11/3612 714/26 |
| 2012/0272206 A1* | 10/2012 | Sengupta | G06F 17/2705 717/101 |
| 2014/0188919 A1* | 7/2014 | Huffman | G06F 16/951 707/758 |
| 2014/0358755 A1* | 12/2014 | Sekino | G06N 20/00 705/35 |
| 2016/0098562 A1* | 4/2016 | Hawblitzel | G06F 8/41 726/22 |
| 2016/0323173 A1* | 11/2016 | Bivens | G06Q 10/06393 |
| 2017/0003937 A1* | 1/2017 | Huebra | G06F 8/20 |
| 2017/0192827 A1* | 7/2017 | Ghafourifar | G06F 9/543 |

* cited by examiner

SOFTWARE FUNCTION VERIFICATION SYSTEM AND SOFTWARE FUNCTION VERIFICATION METHOD

CROSS-REFERENCE TO RELATED APPLICATION

This application claims the priority benefit of Taiwan application serial no. 105115623, filed on May 19, 2016. The entirety of the above-mentioned patent application is hereby incorporated by reference herein and made a part of this specification.

FIELD OF THE INVENTION

The invention relates to a function verification technology and a risk assessment technology applied to a functional document (e.g., a software document, a circuit layout document, a photomask layout document, and so on) through machine learning, i.e., the invention relates to a software function verification system and a software function verification method.

DESCRIPTION OF RELATED ART

In the globalized and digitized world, it is common to entrust or sign a contract with an external manufacturer, such that specific requirements (e.g., specific software functions or designed functions) of a company or circuit design (e.g., electronic circuit layout) owned by the company can be reduced into practice. However, how to verify whether the software complies with the requirements of the company or how to evaluate the risk level and the degree of differences between the actual functions and the required functions of the software are issues to be resolved. From another perspective, the vendor (e.g., the external manufacturer) wants to know whether the final product made by himself complies with the requirements set forth by the planner (e.g., the company) and is desirous of a fair mechanism for evaluating the final product. As such, a number of companies or organizations intend to evaluate the research and development process of each software as well as verify the functions of the software according to certain standards. At present, the known models created for analyzing the development capabilities of software manufacturers as well as assessing the abilities of qualified software contractors are capability maturity model (CMM) and capability maturity model integration (CMMI). However, said models cannot be implemented by automated computer systems nor by verification software; instead, these model require human beings (e.g., software engineers) to obtain the certified programming and coding skills through step-by-step learning.

Hence, whether the outsourced functional documents (e.g., the software document, the circuit layout document, the photomask layout document, and so on) comply with the requirements of the company or whether the coding is appropriate for the company can merely be analyzed manually. Said manual analysis requires a significant amount of labor and thus is deemed time-consuming and costly. Moreover, when the corresponding functions of the functional documents are verified manually, the evaluation of the software may vary according to the qualifications, the experience, and the capabilities of the verifier. For instance, different verifiers may have different points of view regarding the determination on whether the software has extensibility and whether the software can be easily modified. In another aspect, although functions of some software are the same or similar, the logic concepts behind the programming and coding of these software are completely different. As such, various manufacturers prefer to analyze and verify the software functions through computers; according to the unified verification results and the corresponding data, the final analysis is relatively convincing.

SUMMARY

The invention provides a software function verification system and a software function verification method allowing a computer system to automatically analyze functions of functional documents, assess the degree of functional differences between software design and actual requirements or between the programmer and the planner and the risk levels of the functional differences, and collect relevant data, so as to prevent manual verification of software functions and reduce time as well as labor costs.

In an embodiment of the invention, a software function verification system that includes a first database, a second database, a document acquisition device, and a function verification device is provided. The first database includes a plurality of first-party data, and the second database includes a plurality of second-party data. The document acquisition device is configured to acquire a first-party document and a second-party document. The function verification device is coupled to the first database and the second database. The function verification device analyzes the first-party document according to a machine learning technology, the first-party data, and the second-party data to generate a plurality of first-party technology points and converts the first-party technology points into a first-party decision table. The function verification device analyzes the second-party document to generate a plurality of second-party technology points and converts the second-party technology points into a second-party decision table. The function verification device respectively converts the first-party decision table and the second-party decision table into a first-party tree structure and a second-party tree structure and compares the first-party tree structure and the second-party tree structure to determine the degree of functional differences between the first-party document and the second-party document.

In an embodiment of the invention, a software function verification method suitable for a computer system is provided. The software function verification method includes following steps. A first-party document and a second-party document are acquired. The first-party document is analyzed according to a machine learning technology, a plurality of first-party data in a first database, and a plurality of second-party data in a second database to generate a plurality of first-party technology points, and the first-party technology points are converted into a first-party decision table. The second-party document is analyzed according to the machine learning technology, the first-party data, and the second-party data to generate a plurality of second-party technology points, and the second-party technology points are converted into a second-party decision table. The first-party decision table and the second-party decision table are respectively converted into a first-party tree structure and a second-party tree structure. The first-party tree structure and the second-party tree structure are compared to determine a degree of functional differences between the first-party document and the second-party document.

In view of the above, according to the software function verification system and the software function verification method provided herein, the technology points can be acquired through considering semantic features in the context of the functional documents. According to the technology points, design review or code review may be conducted, so as to compare the functional differences between the software in the first-party document and the software in the second-party document and assess the risk level of the functional differences. Thereby, the computer system can be applied to automatically analyze the software function, assess the differences in risks between software design and actual requirements, and collect relevant data, so as to prevent manual verification of software functions and reduce time as well as labor costs. Besides, through the machine learning technology, the required information can be retrieved from the massive data contained in the functional documents (e.g., software documents) for self-learning purposes, so as to perfect the software function verification process automatically performed by the computer system and the functional difference assessment process based on the technology points.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
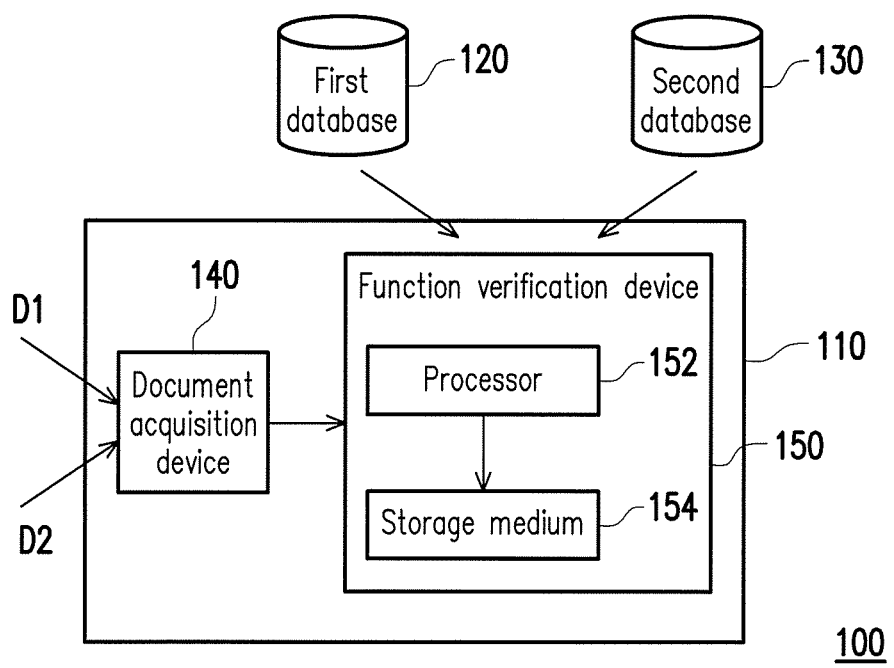
FIG. 1 is a block diagram illustrating a software function verification system according to an embodiment of the invention.

FIG. 1 is a block diagram illustrating a software function verification system 100 according to an embodiment of the invention. The software function verification system 100 includes a computer system 110, a first database (also referred to as a demand-side database) 120, and a second database (also referred to as a plan-side database) 130. The computer system 110 includes a document acquisition device 140 and a function verification device 150. According to the machine learning technology described in an embodiment of the invention, the computer system 100 acquires the technology points through considering semantic features in the context of functional documents, organizes the technology points to generate a semantic decision table, and compares the differences between the semantic decision table of a document obtained from the demand side and the semantic decision table of a document obtained from a planner, so as to conduct design review or code review, compare the functional differences between the software in the document from the demand side and the software in the document from the vendee, and assess the risk level of the functional differences. Through the machine learning technology provided in the present embodiment, functions of the document obtained from the demand side and the document obtained from the planner as well as functions of the document obtained from the planner and the document obtained from the vendor can be verified. Note that the terms "demand side," "planner," and "vendor" merely describe parties whose documents require mutual functional verification, and the disclosure does not pose any limitation to the identity of the actual parties. Hence, it is possible to refer the parties as "the first party" and "the second party". That is, according to the present embodiment, as long as the technology points can be retrieved from the documents (e.g., the software documents, the electronic circuit layout documents, the photomask layout documents, etc.) and can then be compared with the technology points retrieved from another document, said features fall within the scope of protection provided herein. In the present embodiment, the demand-side database may also be referred to as the first-party database, and the plan-side database may be referred to as the second-party database.

Specifically, the document acquisition device 140 may be a physical network protocol or a communication protocol interface card. The function verification device 150 can also be equipped with a communication interface, so as to communicate with other devices and transmit data to other devices (e.g., the first database 120, the second database 130, and even the document acquisition device 140). The function verification device 150 may include a processor 152 and a non-volatile storage medium 154. The processor 152 may implement the software function verification method provided in the present embodiment through the non-volatile storage medium 154 and the corresponding hardware.

The data stored in the first database 120 may be relevant data (e.g., the first-party data) provided by the first party (e.g., "the demand side" or "the outsourcing company") and may be applied for machine learning. By contrast, the second database 130 includes a plurality of functional data provided by the second party (e.g., "the planner"). That is, the second database 130 of the software function verification system 100 may be a software language database, a term base of electronic circuits, and so on, which may vary according to the specific field to which the functional document belongs. The so-called "specific field" may be defined by the use of the functional document, e.g., the fields of different software languages including the C programming language, Verilog, and VC++, circuit layout, photomask design, and so forth.

Terms commonly used in the field of machine learning are explained in the following embodiment. The machine learning technology is often implemented through building a rule set. A rule set is a collection of rules describing structural formalities with natural language. There are two modes of "rule sets". In one mode, the machine learning system starts to check the data in a specific order, i.e., the data are firstly according to the first rule in the rule set, and after the data are all found to comply with the first rule, the data are checked according to the second rule in the rule set; the rest can be deduced therefrom. In the other mode, the machine learning system checks the data according to every rule in the rule set, and whether the data comply with all the rules in the rule set is determined according to an integrated scheme containing all of these rules. In the present embodiment, the machine learning technology is applied to generate a semantic decision table (SDT) according to the rule set in the other mode.

The SDT is a decision table enhanced by applying an advanced ontology engineering (OG) technique. The SDT includes richer decision rule sets than a conventional decision table. The semantics of these rule sets can be derived from an agreement between the decision makers observing the real-word decision issues; that is, rules can be determined by semantics. The process of capturing the semantics may be referred to as a process of knowledge harvest. In the present embodiment, the SDT may be modeled based on the framework of developing ontology-grounded methods and applications (DOGMA). An ontology can be separated into simple linguistic structures by applications, and the layer of the linguistic structures can be adaptively adjusted. Here, the "linguistic structure" can be referred to as Lexon. In the DOGMA framework, the SDT has a layer of the decision binary fact types (also known as SDT Lexons) and a SDT commitment layer including the constraints and axioms of these fact types. Lexons may be represented by objects in a natural language and the relationship or rules among the objects. The SDT commitment layer formally defines selected rules and constraints whereby an application (or an agent) may make use of Lexons. Based on actual needs, the commitment layer may include a plurality of constraints, rules, and axiomatized binary facts, and the commitment layer may establish models by means of a variety of modeling tools, e.g., through object-role modeling, conceptual graph (CG), and unified modeling language (UML). In the present embodiment, UML is applied to build models.

Figure 2:
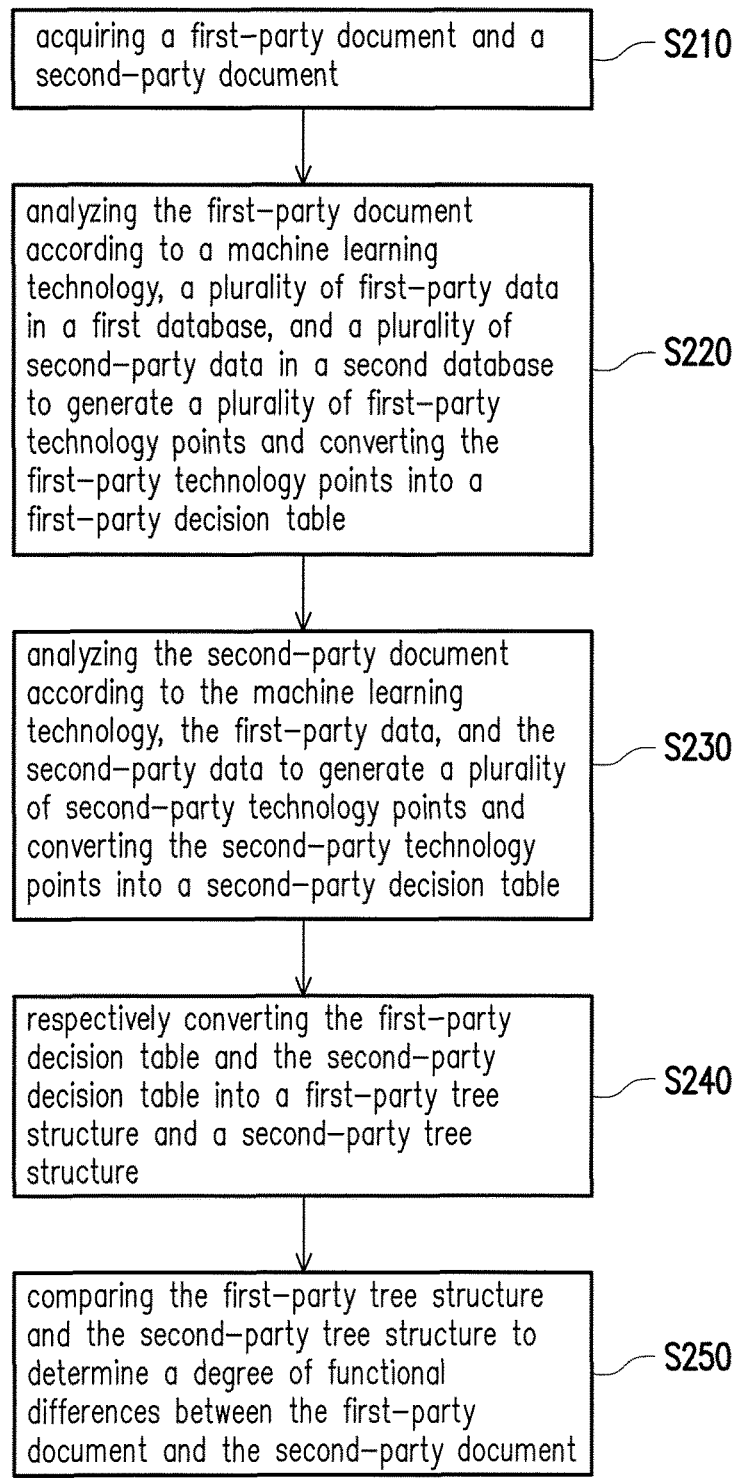
FIG. 2 is a flowchart illustrating a software function verification method according to an embodiment of the invention.

FIG. 2 is a flowchart illustrating a software function verification method according to an embodiment of the invention. The software function verification method is applicable to the computer system 110 and the software function verification system 100 depicted in FIG. 1. With reference to FIG. 1 and FIG. 2, in step S210, the document acquisition device 140 is configured to acquire a first-party document D1 and a second-party document D2. In the present embodiment, the first-party document D1 may be a document complying with certain requirements of a company, a circuit design document, or a document of which the contents are in natural language or can be learned by the document acquisition device 140. The second-party document D2 can be a software document, a circuit layout document, or a photomask layout document completed by an external vendor. These types of documents can execute certain functions after being read by specific software or machine, and thus these documents are referred to as "the second-party document".

In step S220, the processor 152 in the function verification device 150 analyzes the first-party document D1 according to a machine learning technology, a plurality of first-party data in the first database 120, and a plurality of second-party data in the second database 130 to generate a plurality of first-party technology points, and the first-party technology points are converted into a first-party decision table. Similarly, in step S230, the processor 152 analyzes the second-party document D2 according to the machine learning technology, the first-party data, and the second-party data to generate a plurality of second-party technology points, and the second-party technology points are converted into a second-party decision table. In the present embodiment, the first-party decision table and the second-party decision table are semantic decision tables. The order of the steps S220 and S230 provided herein can be exchanged; that is, the order of generating the first-party decision table and the second-party decision table should not be construed as a limitation to the invention. The details of the steps S220 and S230 will be elaborated with reference to FIG. 3.

In step S240, the processor 152 in the function verification device 150 respectively converts the first-party decision table generated in the step S220 and the second-party decision table generated in the step S230 into a first-party tree structure and a second-party tree structure. Since the data structure of the tree structures is easier for comparison than the data structure of the SDTs, the aforesaid SDTs are converted into the tree structures. In step S250, the processor 152 compares the first-party tree structure and the second-party tree structure to determine the degree of functional differences between the first-party document D1 and the second-party document D2. Each node and leaf point in the first-party tree structure and the second-party structure can be compared in a one-by-one manner through a tree structure comparison algorithm, so as to learn the difference between the two tree structures and acquire the comparison results. On the other hand, according to the comparison results of the tree structures, the function verification device 150 may calculate the degree of functional differences between the first-party document D1 and the second-party document D2 through applying a weighted function classifying method or a gradient boosting machine classifying method. The degree of differences can be represented by percentage, by levels (e.g., level 1 to level 10), or by numbers. The present embodiment does not pose any limitation to the way to represent the degree of differences; instead, it is more important for users to obtain the objective data indicating the functional differences by means of the software function verification system 100.

Figure 3:
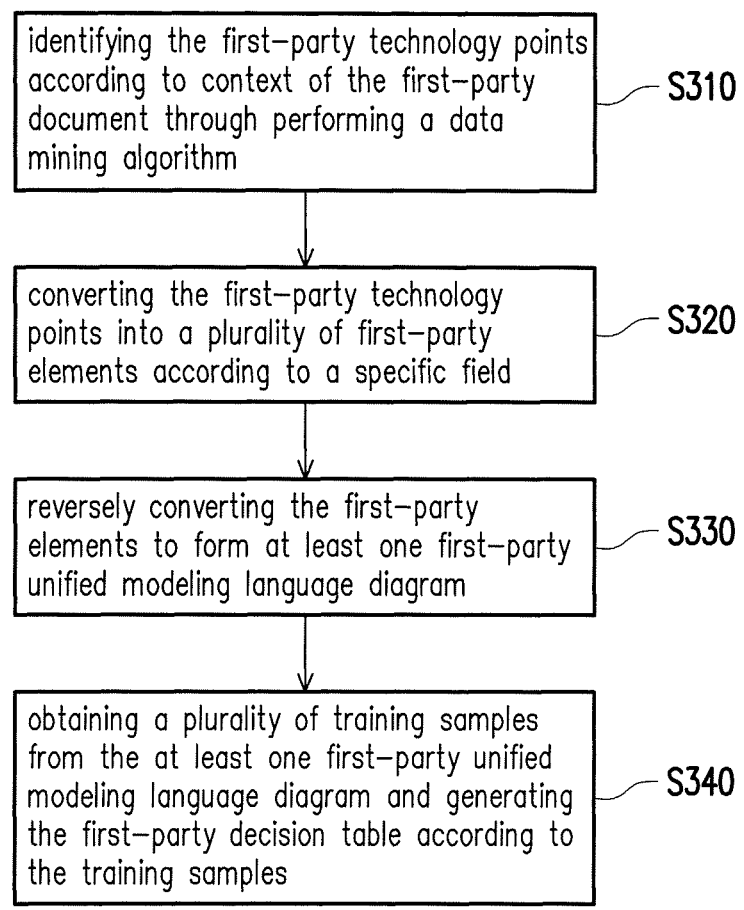
FIG. 3 is a flowchart illustrating the details of steps S220 and S230 in the software function verification method provided in an embodiment of the invention.

FIG. 3 is a flowchart illustrating the details of steps S220 and S230 in the software function verification method provided in an embodiment of the invention. In the steps S220 and S230, the function verification device 150 generates the SDT (e.g., the first-party decision table or the second-party decision table) according to the corresponding documents (e.g., the first-party document or the second-party document); hence, the details of the steps S220 and S230 are elaborated herein with reference to FIG. 3, and the first-party document and the first-party decision table serve as examples here. It is possible to change the "first-party document" to the "second-party document", so as to generate the second-party decision table. With reference to FIG. 1 and FIG. 3, in step S310, the function verification device 150 identifies the first-party technology points in the first-party document D1 according to the context of the first-party document D1 through performing a data mining algorithm. The first-party technology points can be referred to as design patterns. In the present embodiment, the data mining algorithm is a semi-supervised probabilistic pattern recognition algorithm, so as to effectively acquire the required first-party technology points and prevent errors from being spread.

In step S320, the function verification device 150 converts the first-party technology points into a plurality of first-party elements according to users' settings or a specific field obtained through auto-detection by the function verification device 150. Here, the "specific field" can be determined by the users, so as to achieve favorable results; certainly, the "specific field" may be automatically determined by the function verification device 150 according to the context of the document. In the present embodiment, the first-party elements may be UML elements. In step S330, the function verification device 150 reversely converts the first-party elements according to a Cleanroom design to form at least one first-party UML diagram.

In step S340, the function verification device 150 obtains a plurality of training samples from the at least one first-party UML diagram and generates the first-party decision table according to the training samples. The function verification device 150 may acquire the training samples from the UML diagram corresponding to the first-party decision table or the second-party decision table and use these training samples to train the corresponding first-party or second-party decision table. These training samples can be obtained through sampling; alternatively, all samples are applied as the training samples without performing any sampling process. In some embodiments of the invention, the function verification device 150 may obtain antecedent lists after a pre-data mining process is performed on the UML diagram, and the decision tables can be trained with use of the training samples in the antecedent lists. During the training process, the function verification device 150 may train the decision tables according to the training samples and select one of the algorithms pertinent to mathematical optimization from the decision tables as the first-party decision table. In the present embodiment, one of the decision tables may be selected as the first-party decision table through performing an algorithm combining Benders decomposition and simulated annealing, which will be elaborated below.

In a spark lambda architecture in the large-data machine learning field, it is assumed that the total loss in the batch view can be represented by formula (1):

$$Loss(a; N_b) = \frac{1}{N_b} \sum_{i=1}^{N_b} Loss(a; (x_i, y_i)) \quad (1)$$

Here, "a" in the formula (1) represents a preliminary list, "$x_i$" and "$y_i$" are training samples, $N_b$ is a positive integer, and "Loss(a)" is a function with a convex upper bound, e.g., a hinge loss, a logistic loss, or an index loss.

The total loss in the realtime view can be represented by formula (2), wherein $N_r$ is a positive integer, $$Loss(a; N_r) = \frac{1}{N_r} \sum_{j=1}^{N_r} Loss(a; (x_j, y_j)) \quad (2)$$

The total loss of said total loss in the batch view and said total loss in the realtime view can be represented by formula (3):

$$Loss(a; N_m) = \frac{1}{N_b + N_r} \left( \sum_{i=1}^{N_b} Loss(a; (x_i, y_i)) + \sum_{j=1}^{N_r} Loss(a; (x_j, y_j)) \right) \quad (3)$$

In the present embodiment, the optimal SDT parameters can be found through said formulas, so as to select the first-party SDT or the second-party SDT with the best solution from plural SDTs.

Figure 4:
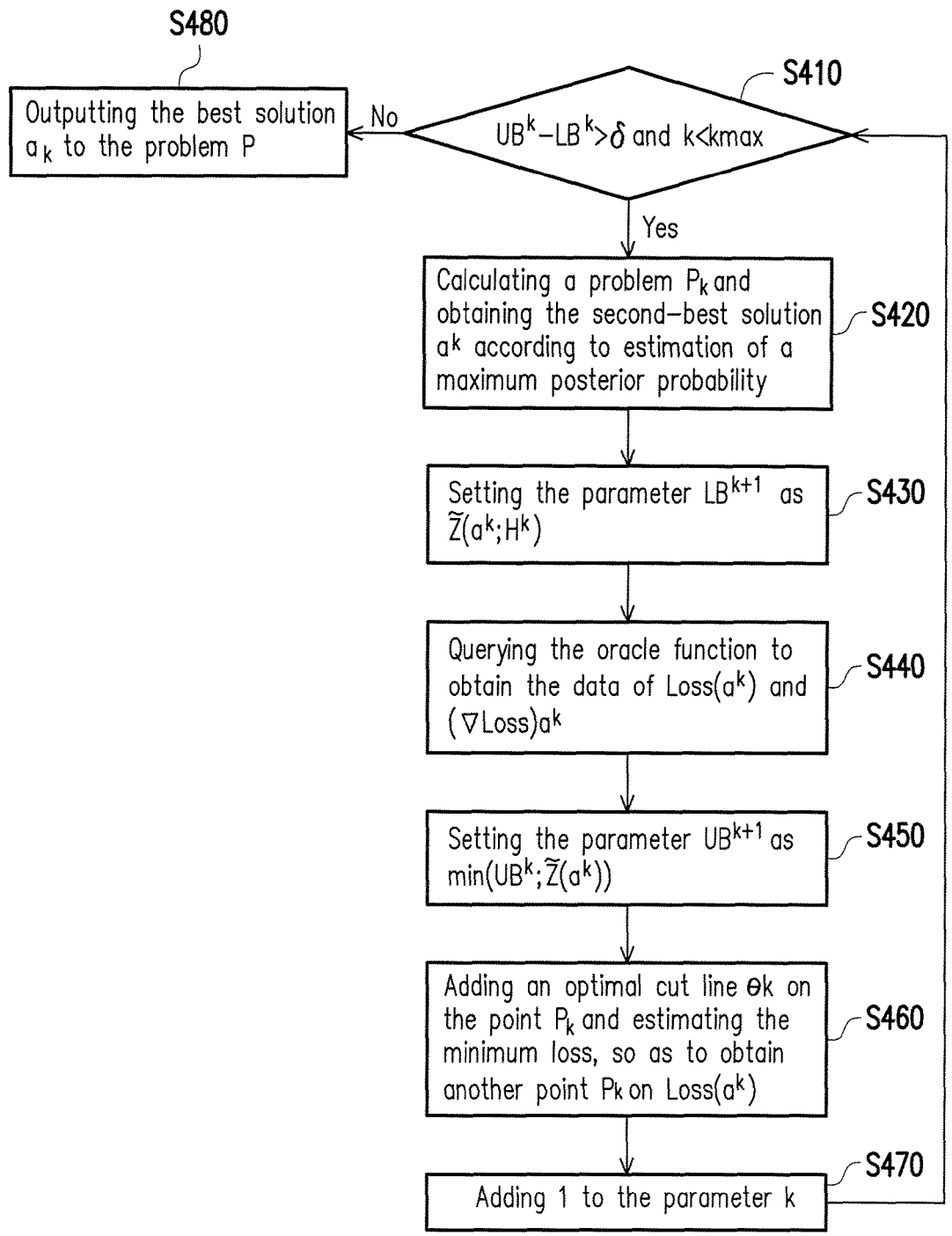
FIG. 4 is a flowchart illustrating an algorithm combining Benders decomposition and simulated annealing.

In the field of mathematical optimization, the algorithm combining Benders decomposition and simulated annealing is applied to select a preferable SDT from the SDTs. FIG. 4 is a flowchart illustrating an algorithm combining Benders decomposition and simulated annealing. With reference to FIG. 1 and FIG. 4, all steps depicted in FIG. 4 can be performed by the processor 152 shown in FIG. 1.

Relevant parameters should be determined first. The parameter δ is a gap within a tolerance having an upper limit and a lower limit. P is an original optimization problem having an objective function and can be represented by the following formula (4):

$$\tilde{Z}(a) = (a) + C\Phi(a) \quad (4)$$

P0 is an initial proxy problem having the objective function and can be represented by the following formula (5):

$$\tilde{Z}(a; H^0) = 0 + C\Phi(a) \quad (5)$$

The cut line θ can be represented by the following formula (6):

$$\theta \geq Loss(\alpha^N) + (\nabla Loss)_{\alpha^N}(a - \alpha^N) \quad (6)$$

The parameter $a^N$ is one of the units in an antecedent collection a in the antecedent list. The start value of the parameter k is 0, the start value of the parameter $UB^k$ is an infinite value, and the start value of the parameter $LB^k$ is 0. The oracle function can be applied to calculate $Loss(\alpha^N)$ and $(\nabla Loss)_{\alpha^N}$, so as to obtain the data after calculating $Loss(\alpha^N)$ and $(\nabla Loss)_{\alpha^N}$.

In step S410, the processor 152 determines whether the value obtained by subtracting the parameter $LB^k$ from the parameter $UB^k$ is smaller than the gap δ within the tolerance, i.e., $UB^k - LB^k > \delta$, and the processor 152 also determines whether the parameter k is smaller than the maximum value kmax of the parameter k, i.e., k<kmax. If yes, the processor 152 in step S420 calculates the problem $P_k$ and obtains the second-best solution $a^k$ according to estimation of a maximum posterior probability. In step S420, the processor 152 does not stop calculating the problem $P_k$ through applying the simulated annealing algorithm repeatedly until the preferable solution $a^k$ is obtained or the scheduled calculation time is up. Given that the simulated annealing algorithm is adopted, the estimated maximum posterior probability acts as a target for obtaining the preferable solution.

In step S430, the processor 152 sets the parameter $LB^{k+1}$ as $\tilde{Z}(a^k; H^k)$. In step S440, the processor 152 queries the oracle function to obtain the data of $Loss(\alpha^k)$ and $(\nabla Loss)_{\alpha^k}$. In step S450, the processor 152 sets the parameter $UB^{k+1}$ as $min(UB^k; \tilde{Z}(\alpha^k))$. In step S460, the processor 152 adds an optimal cut line θk on the point $P_k(\theta \geq Loss(a^k) + (\nabla Loss)_{\alpha^k})$ and estimates the minimum loss, so as to obtain another point $P_k$ on $Loss(\alpha^k)$. That is, through performing the Benders decomposition algorithm, the preferable solution is obtained according to estimation of the minimum loss. In step S470, the processor 152 adds 1 to the parameter k and returns to step S410, so as to repeat said steps. If both $UB^k - LB^k > \delta$ and k<kmax are not true, in step S480, the processor 152 can output the best solution $a^k$ to the problem P as the best SDT provided in the present embodiment.

It should be mentioned that when the processor 152 determines whether the step S410 should be performed again to calculate the best solution, the processor 152 not only determines whether the conditions of the Benders decomposition algorithm are all met in step S460 but also determines whether the conditions of the simulated annealing algorithm are all met in step S420. Therefore, in the present embodiment, the conditions of the Benders decomposition and the conditions of the simulated annealing algorithm are considered, so as to obtain the second-best solution and enhance the accuracy and the executing efficiency of the algorithm.

To sum up, in the risk assessment system and the data processing method provided in the embodiments of the invention, risks can be assessed by the context of data and the modeling algorithm with low complexity, and the utilization efficiency can be enhanced.

Although the disclosure has been provided with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A software function verification system comprising:
a first database comprising a plurality of first-party data;
a second database comprising a plurality of second-party data;
a document acquisition device configured to acquire a first-party document and a second-party document; and
a function verification device coupled to the first database and the second database, wherein the function verification device analyzes the first-party document according to a machine learning technology, the first-party data, and the second-party data to generate a plurality of first-party technology points and converts the first-party technology points into a first-party decision table,
the function verification device analyzes the second-party document according to the machine learning technology, the first-party data, and the second-party data to generate a plurality of second-party technology points and converts the second-party technology points into a second-party decision table,
wherein the machine learning technology is adapted to build a collection of rules to describe structural formalities with natural language, the machine learning technology checks whether the first-party data and the second-party data comply to the rules, and is applied to generate the first-party decision table and the second-party decision table according to an integrated scheme containing all the rules,
and the function verification device respectively converts the first-party decision table and the second-party decision table into a first-party tree structure and a second-party tree structure and compares the first-party tree structure and the second-party tree structure to determine a degree of functional differences between the first-party document and the second-party document.

2. The software function verification system of claim 1, wherein the function verification device identifies the first-party technology points according to context of the first-party document through performing a data mining algorithm, converts the first-party technology points into a plurality of first-party elements according to a specific field, reversely converts the first-party elements to form at least one first-party unified modeling language diagram, obtains a plurality of training samples from the at least one first-party unified modeling language diagram, and generates the first-party decision table according to the training samples.

3. The software function verification system of claim 2, wherein the data mining algorithm is a semi-supervised probabilistic pattern recognition algorithm.

4. The software function verification system of claim 1, wherein the function verification device trains the decision tables according to the training samples and selects one of the decision tables as the first-party decision table.

5. The software function verification system of claim 1, wherein the function verification device calculates the degree of functional differences between the first-party document and the second-party document through applying a weighted function classifying method or a gradient boosting machine classifying method.

6. A software function verification method suitable for a computer system, the software function verification method comprising:
acquiring a first-party document and a second-party document;
analyzing the first-party document according to a machine learning technology, a plurality of first-party data in a first database, and a plurality of second-party data in a second database to generate a plurality of first-party technology points and converting the first-party technology points into a first-party decision table;
analyzing the second-party document according to the machine learning technology, the first-party data, and the second-party data to generate a plurality of second-party technology points and converting the second-party technology points into a second-party decision table;
wherein the machine learning technology is adapted to build a collection of rules to describe structural formalities with natural language, the machine learning technology checks whether the first-party data and the second-party data comply to the rules, and is applied to generate the first-party decision table and the second-party decision table according to an integrated scheme containing all the rules,
respectively converting the first-party decision table and the second-party decision table into a first-party tree structure and a second-party tree structure; and
comparing the first-party tree structure and the second-party tree structure to determine a degree of functional differences between the first-party document and the second-party document.

7. The software function verification method of claim 6, wherein the step of analyzing the first-party document to generate the first-party technology points and converting the first-party technology points into the first-party decision table comprises:
identifying the first-party technology points according to context of the first-party document through performing a data mining algorithm;
converting the first-party technology points into a plurality of first-party elements according to a specific field;
reversely converting the first-party elements to form at least one first-party unified modeling language diagram; and
obtaining a plurality of training samples from the at least one first-party unified modeling language diagram and generating the first-party decision table according to the training samples.

8. The software function verification method of claim 6, wherein the step of generating the first-party decision table according to the training samples comprises:
training the decision tables according to the training samples; and
selecting one of the decision tables as the first-party decision table through performing an algorithm combining Benders decomposition and simulated annealing, wherein through performing the simulated annealing algorithm, a preferable solution is obtained according to estimation of a maximum posterior probability, and through performing the Benders decomposition algorithm, a preferable solution is obtained according to estimation of a minimum loss.

* * * * *